United States Patent [19]
den Heijer et al.

[11] Patent Number: 4,920,288

[45] Date of Patent: Apr. 24, 1990

[54] PISTON ENGINE WITH DYNAMIC GROOVE BEARING INTERNAL TO PISTON AND ISOLATED FROM COMPRESSION SPACE

[75] Inventors: Ronald den Heijer; Godefridus C. Goverde, both of Eindhoven; Peter G. M. Simons, Best, all of Netherlands

[73] Assignee: U.S. Philips Corporation, New York, N.Y.

[21] Appl. No.: 329,750

[22] Filed: Mar. 28, 1989

[30] Foreign Application Priority Data

May 19, 1988 [NL] Netherlands ........................ 8801293

[51] Int. Cl.[5] ........................ H02K 33/00; F16C 31/00

[52] U.S. Cl. .......................................... 310/15; 92/51; 92/107; 310/90; 384/13; 384/115

[58] Field of Search ....................... 310/13, 15, 22, 24, 310/90; 384/13, 42, 115, 292; 417/340, 415, 416, 417, 492, 500

[56] References Cited

U.S. PATENT DOCUMENTS

| | | | |
|---|---|---|---|
| 4,523,800 | 6/1985 | Yamashita et al. | 384/115 |
| 4,596,474 | 6/1986 | van Römburg | 384/115 |
| 4,697,113 | 9/1987 | Young | 310/15 |
| 4,799,421 | 1/1989 | Bremer et al. | 417/418 |

FOREIGN PATENT DOCUMENTS

| | | | |
|---|---|---|---|
| 1086214 | 4/1984 | U.S.S.R. | 417/418 |

*Primary Examiner*—Patrick R. Salce
*Assistant Examiner*—D. L. Rebsch
*Attorney, Agent, or Firm*—Brian J. Wieghaus

[57] ABSTRACT

A piston engine having a reciprocating piston, which is journalled in a radial direction with respect to the direction of translation by means of at least one dynamic groove bearing located within the piston and is separated from a compression space by an annular sealing gap at an outer surface of the piston. The piston engine is suitable for use in compressors and cryo-coolers, more particularly for cooling of computer processors.

24 Claims, 4 Drawing Sheets

PISTON ENGINE WITH DYNAMIC GROOVE BEARING INTERNAL TO PISTON AND ISOLATED FROM COMPRESSION SPACE

BACKGROUND OF THE INVENTION

The invention relates to a piston engine comprising a piston which is movable in a reciprocating manner in a cylinder by means of an electric translatory motor, displaces a gaseous medium and is journalled in a radial direction with respect to the direction of movement of the piston by means of at least one dynamic groove bearing.

The invention further relates to a compression device provided with two piston engines of the aforementioned kind coupled to each other.

The invention also relates to a cryo-cooler comprising a piston engine of the kind already mentioned.

The non-prepublished Netherlands Patent Application No. 8800055, which corresponds to U.S. application Ser. No. 194,763 filed May 17, 1988, discloses a piston engine, a compression device and a cryo-cooler of the kind mentioned in the opening paragraph. The piston engine then forms part of the compression device of a cryo-cooler. In such a piston engine, the electric translatory motor is situated between two dynamic groove bearings, as a result of which a construction of comparatively great length is obtained.

SUMMARY OF THE INVENTION

The invention has for its object to provide a piston engine, a compression device and a cryo-cooler having a comparatively compact construction, which can be manufactured in a comparatively simple manner.

The piston engine according to the invention is for this purpose characterized in that the piston is journalled with a circular-cylindrical inner surface located within the piston on a circular-cylindrical outer surface of a guide concentric with the piston by means of the dynamic groove bearing. The dynamic groove bearing is separated from a compression space adjoining an end face of the piston by means of a circular-cylindrical sealing gap having an annular cross-section.

It should be noted that US-A-4697113 discloses a piston engine, a compression device and a cryo-cooler both separately and in combination. However, the pistons in the known piston engine, compression device and cryo-cooler are constructed so that they can translate in the cylinders without a specific radial journalling.

A particular embodiment of the piston engine, in which the radial journalling of the piston is obtained by means of a comparatively small number of component parts, is further characterized in that the guide concentric with the piston is a fixedly arranged mandrel inserted into the piston.

A further embodiment of the piston engine having a rotary motor which is integrated in a compact construction is characterized in that the piston is rotatable about the fixedly arranged mandrel by means of an electric rotary motor, of which a stator coil is secured to an inner wall of a chamber in the fixedly arranged mandrel, while a permanent magnetic rotor of the rotary motor is located on a support which is connected to the piston and extends in the chamber of the mandrel as far as within the stator coil.

A still further embodiment of the piston engine, in which the dynamic groove bearing can be manufactured in a comparatively simple manner, is further characterized in that a groove pattern of at least one dynamic groove bearing is provided in a circular-cylindrical outer surface of the mandrel serving as a guide for the piston.

A compactly constructed compression device that can be manufactured in a simple manner is provided with two piston engines according to the invention coupled to each other, the compression space being limited on both sides by the end face of the piston of the said piston engines and being connected to a load.

A compactly constructed cryo-cooler that can be manufactured in a simple manner and comprises a piston engine or a compression device according to the invention is characterized in that the compression space is connected via a regenerator to an expansion space accommodating a displacer that can be moved in a reciprocating manner.

BRIEF DESRIPTION OF THE DRAWINGS

The invention will be described more fully with reference to the drawing, in which FIG. 1 is a longitudinal sectional view of a dual piston engine according to the invention, FIG. 2 is a longitudinal sectional view of a compression device according to the invention, FIG. 3 is a plan view of a cryo-cooler according to the invention, FIG. 4 is a side elevation of the cryo-cooler shown in FIG. 3, FIG. 5 shows on an enlarged scale a sectional view of a part of the cryo-cooler shown in FIGS. 3 and 4.

DETAILED DESCRIPTION OF THE PREFERRED EMBODIMENTS

Figure 1:
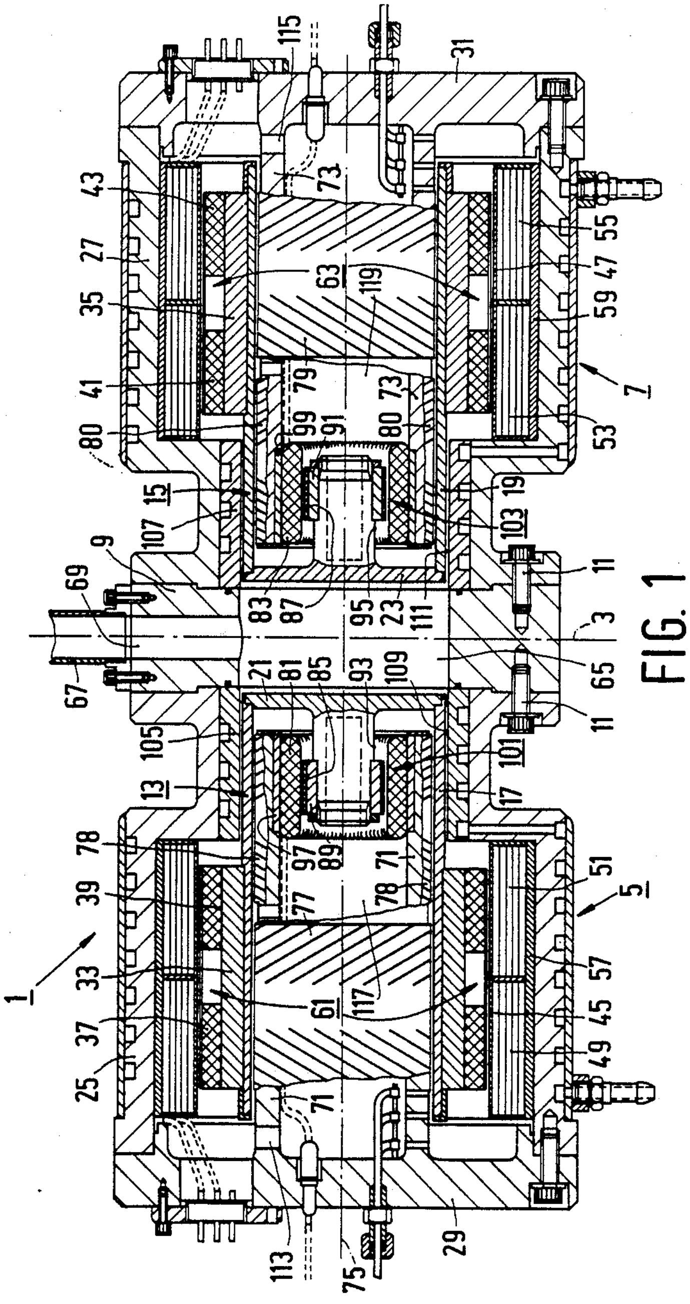

FIG. 1 illustrates a device 1 which is symmetrical to a line 3 and is constructed of two identical piston engines 5 and 7 according to the invention. The device operates as a compression device which can be extended to a compressor shown in FIG. 2 or can be integrated in a cryo-cooler shown in FIGS. 3 and 4. It should be noted that the piston engines 5 and 7 arranged on either side of the line 3 in FIG. 1 can each separately be extended to a so-called single piston compressor. The dual piston engine shown in FIG. 1 can be considered as a compressor of the so-called "boxer" type. The piston engines 5 and 7 are coupled to each other by means of a connection ring 9 and bolts 11. Reciprocating pistons (13, 15) are located in the two respective piston engines (5, 7) and are constructed of circular-cylindrical tubes (17, 19) and bottoms (21, 23) connected thereto. The pistons (13, 15) are arranged in respective housings (25, 27), which are closed by covers (29, 31). Circular-cylindrical sleeves (33, 35) of, for example, cobalt iron are secured on the pistons (13, 15). Each of the sleeves (33, 35) serves as a support for two respective annular permanent magnets (37, 39) and (41, 43) of, for example, samarium cobalt. The permanent magnets (37, 39) and (41, 43) are freely displaceable along the circular-cylindrical inner wall of coil formers (45 and 47, respectively), on which coils (49, 51) and (53, 55) are secured, which are enclosed in sleeves (57, 59) of, for example, cobalt iron. The two assemblies constituted by the sleeves (33, 35), the radially magnetized permanent magnets (37, 39, 41, 43), the coils (49, 51, 53, 55) and the sleeves (57, 59) act as translatory motors (61, 63) of the brushless direct current type for the translatory movement of the pistons (13, 15). Between the bottoms (21, 23) (end faces) of the pistons (13, 15) is present a compression space 65 filled with a gaseous working medium, such as, for example, helium. The compression space 65 can be connected by means of a lead 67 to an arrangement to be described more fully below with reference to FIGS. 3, 4 and 5, which constitutes together with the compression device 1 a cryo-cooler. The connection ring 9 is provided with a radial duct 69 intended for connection to the lead 67.

The covers (29, 31) are provided with circular-cylindrical mandrels in the form of cylindrical guides (71 and 73, respectively) for the pistons (13, 15). The guides (71, 73) are arranged concentrically with respect to the pistons (13, 15). The center lines of the pistons (13, 15) and the guides (71, 73) coincide with a center line 75 of the device 1. Fishbone-shaped groove patterns (77, 78, 79, 80) constituting radially acting pairs of dynamic groove bearings are situated on the circular-cylindrical outer surfaces of the guides (71 and 73, respectively). The guides (71, 73) in the form of a fixedly arranged mandrel inserted into the pistons (13, 15) carry near their ends facing the bottoms (21, 23) fixedly arranged coils (81, 83). Within the coils (81, 83), annular radially magnetized permanent magnets (85, 87) of samarium cobalt are provided, which are secured by means of cobalt iron rings (89, 91) on tube-shaped supports (93, 95), which are integral with the bottoms (21, 23). The coils (81, 83) are enclosed in cobalt iron sleeves (97, 99). The two assemblies constituted by the sleeves (97, 99), the coils (81, 83), the multipole permanent magnets (85, 87) and the rings (89, 91) act as rotary motors (101, 103) of the brushless direct current type for the rotary movement of the pistons (13, 15), which is required to obtain a radial dynamic gas bearing at the area of the groove patterns (77, 78, 79, 80).

To the inner walls of the housings (25, 27) are secured sleeves (105, 107), along whose inner walls the pistons (13, 15) are freely displaceable. Between the sleeves (105, 107) and the pistons (13, 15) is situated a circular-cylindrical annular sealing gap (109, 111) located between the compression space 65 and the relevant pair of dynamic groove bearings. Due to the fact that the locations of the annular sealing gaps (109, 111) and the corresponding pairs of dynamic groove bearings are mutually separated, a comparatively large gap width of in the present case 25 μm is sufficient at the area of the sealing gaps. The desired seal is obtained by an appropriate length of the sealing gaps. Due to the separated locations of bearing and seal on the inner and the outer sides of the pistons, the comparatively great length of the sealing gaps is acceptable because the dynamic groove bearings are now arranged within the translatory motors (61, 63). Thus, nevertheless a compact construction is obtained in a direction parallel to the center line 75 as compared with the configuration in which the translatory motor is arranged between two dynamic groove bearings with adjoining sealing gaps. The spaces around the motors (61, 63) and the spaces within the guides (71, 73) communicate with each other through radial ducts (113, 115). As a result, a comparatively large space is obtained, in which the reciprocating movement of the pistons (13, 15) causes only a small variation with respect to the average pressure level. This favors an optimum operation of the dynamic groove bearings. The supports (93, 95) of the rotary motors (101, 103) extending into chambers (117, 119) of the guides or mandrels (71, 73) permit of obtaining a very compact construction with only a few component parts.

Figure 2:
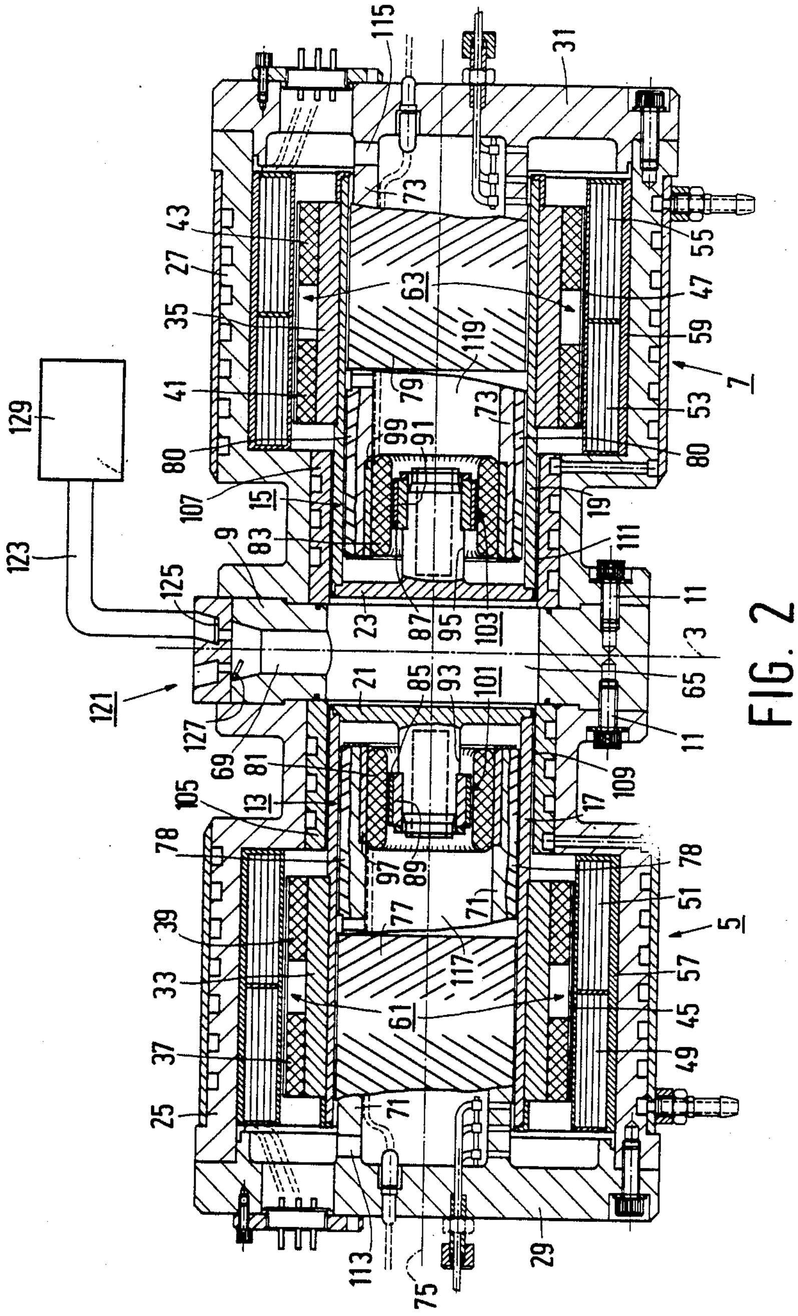
Figure 3:
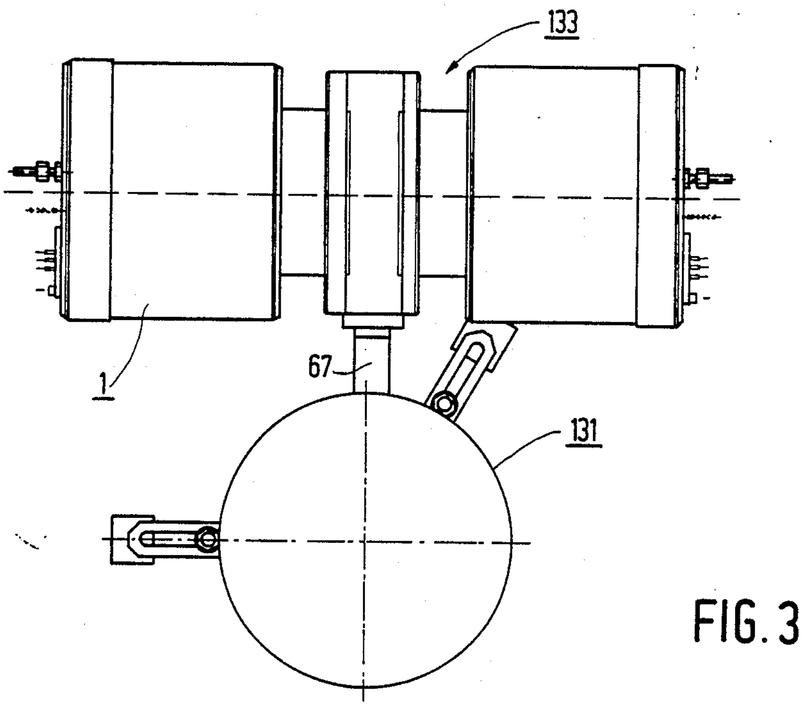
Figure 4:
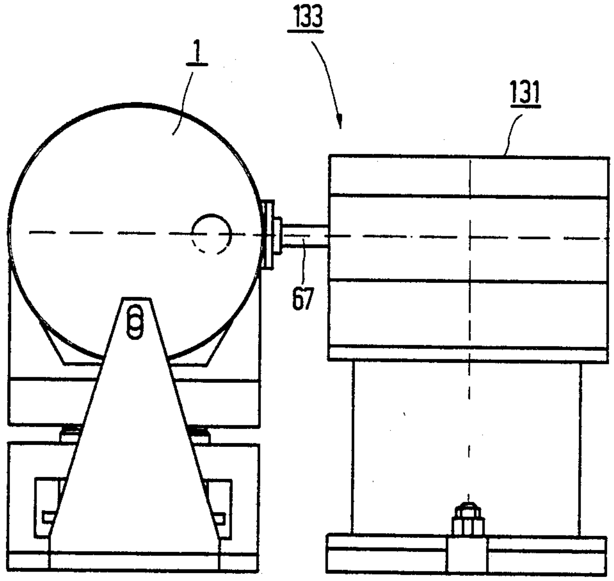
Figure 5:
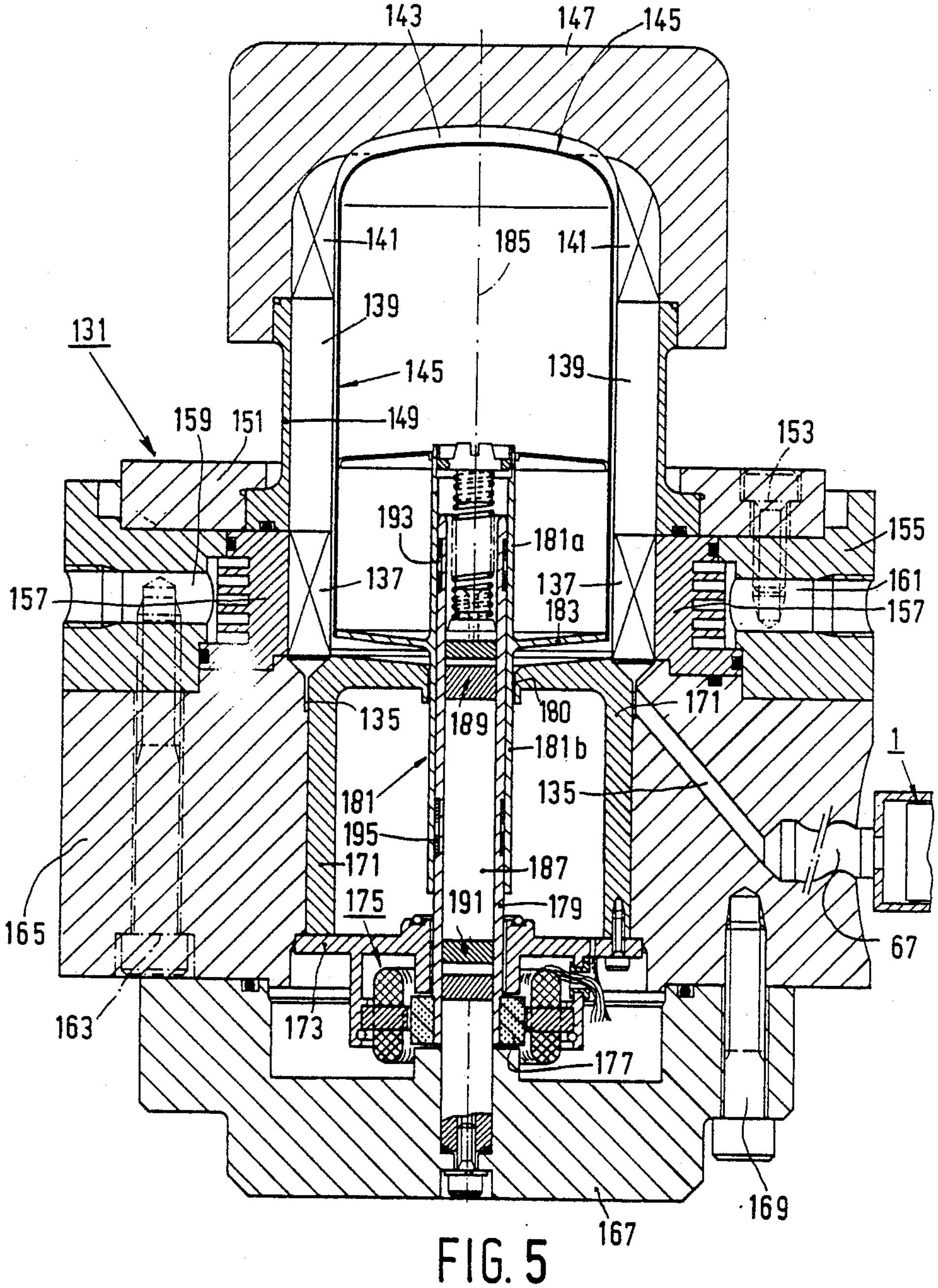

In dependence upon the application of the compression device shown in FIG. 1 with the dual piston engine, the duct 69 is closed with a so-called valve cover and is connected to a device as shown in FIGS. 3, 4 and 5. As will appear from FIG. 2, which is provided for the major part with reference numerals corresponding to FIG. 1, a valve cover 121 with a pressue valve 125 connected to a lead 123 of a load and a suction valve 127 connected to the environment is used. The dual piston engine as shown in FIG. 2 constitutes a compressor of the boxer type, which supplies compressed air to a load 129 shown diagrammatically.

In the case in which the lead 67 is connected to an expansion device 131 (load) shown in detail in FIG. 5, a cryo-cooler 133 shown in plan view and in side elevation in FIGS. 3 and 4, respectively, is obtained. It should be noted that the term "load" with respect to the expansion device 131 does not exclude that always the same sealed quantity of working medium is cnncerned. The gas pressure fluctuations produced in the compression space 65 of a compression device 1 as shown in FIG. 1 are transmitted via the lead 67 and a duct 137 in the expansion device 131 to the part of the gaseous working medium (helium gas) situated in a cooler 137, a regenerator 139, a freezer 141 and an expansion space 143 above a substantially circular-cylindrical displacer 145, which is driven by gas pressure differences and a difference in effective surface area on either side of the displacer. The expansion space 143 is closed on the upper side by a cover 147, which is screwed onto a pipe 149 provided at both ends with screw-thread. On its lower side, the pipe 149 is screwed into a ring 151, which is secured with bolts 153 on a holder 155 for a heat exchanger 157, which forms part of the cooler 137. The holder 155 is provided with ducts 159 and 161 for supply and discharge of a cooling liquid. By means of bolts 163, a housing 165 is secured to the holder 155. The expansion device 131 is closed on the lower side by a further cover 167, which is secured by means of bolts 169 to the housing 165. The housing 165 accommodates a circular-cylindrical guide 171, to which a holder 173 for a rotary motor 175 is secured. The rotary motor 175 is a brushless direct current motor, of which a rotor magnet 177 is secured on a rotary pipe 179, which is rotatably journalled in a guide pipe 181 surrounded by a sealing gap 180. The displacer 145 has a bottom 183, which is integral with the guide pipe 181. The rotary pipe 179 accommodates a shaft 187 fixedly arranged in a direction parallel to the center line 185 of the expansion device 131. The rotary pipe 179 is journalled with respect to the shaft 187 by two dynamic groove bearings 189 and 191, whose fishbone-shaped groove patterns are located on the shaft 187. Further, the rotary pipe 179 is journalled with respect to the guide pipe 181 by two dynamic groove bearings 193 and 195, whose fishbone-shaped groove patterns are located on the rotary pipe 179, which is freely displaceable in the guide 171. For the sake of a compact construction, an upper part 181*a* of the guide pipe 181 is located within the displacer 145 and a lower part 181*b* thereof is located outside the displacer 145. The center line 185 of the expansion device 131 coincides with the center lines of the displacer 145, the guide pipe 181, the rotary pipe 179 and the shaft 187.

The cryo-cooler according to the invention described is of course not limited to a cooler comprising an expansion device 131 as shown in FIG. 5, in which the displacer 145 is driven by pressure differences due to friction. The displacer 145 may also have its own drive, for example by an electric motor, of which a translatory magnet is coupled to the guide pipe 181. In this connection, reference may be made to Netherlands Patent Application No. 8800055 in the name of N. V. Philips' Gloeilampenfabrieken. The construction on which the cryo-cooler, compression device and piston engine described are based is very suitable because of compactness, a very small number of component parts and the comparatively simple method of manufacturing. Journalling of the rotary/translatory pistons by means of dynamic groove bearings leads to a very long life, as a result of which the piston engine may be used, for example, in a field such as the cooling of computer processors. In this case, the processor is situated in a cryostat, whose cooling liquid is kept at a very low temperature (for example 77 K) by means of a cryo-cooler as described above.

The pistons (13, 15) may also be arranged so as to be free from rotation. In this case, use may be made of a rotary pipe which is located within the pistons and is journalled radially by means of dynamic groove bearings with respect to the pistons (13, 15) and the guides (71, 73). In this connection, reference may be made to the aforementioned Netherlands Patent Application.

A compression device according to the invention may also be provided with only one piston engine according to the invention.

It should finally be noted that, although the invention has been described with reference to a piston engine, a compression device and a cryo-cooler with pistons journalled radially by pairs of dynamic groove bearings, singly journalled pistons are also possible. In this case, the piston of a piston engine is radially journalled by only one dynamic groove bearing. The fact whether such a single journalling is possible also depends upon the piston engine, especially upon the length of the piston.

We claim:

1. A piston engine comprising a circular cylinder, a piston that is reciprocable in said cylinder for working on a gaseous medium present in said cylinder during engine operation, and means for reciprocating said piston in said cylinder, the improvement comprising:

said piston being tubular and having an inner and outer wall surface of circular cross-section, said piston being open at one end and having a transverse end face at the opposite end, said engine having a compression space opposite said piston end face into which said gaseous medium is compressed during piston reciprocation, an elongate circular-cylindrical guide concentric with said cylinder having an outer surface, and extending into said piston through said open end, said outer surface of said guide and said inner wall surface of said piston comprising a dynamic groove bearing for centering said piston in said cylinder during reciprocation of said piston, and said piston being sized near said end face for forming a sealing gap with said cylinder, whereby said dynamic groove bearing is isolated from said compression space by said sealing gap.

2. A piston engine as claimed in claim 1, characterized in that said guide is a fixedly arranged mandrel.

3. A piston engine as claimed in claim 2, characterized in that said dynamic groove bearing cmprises a groove pattern on said outer surface of said guide.

4. A piston as claimed in claim 1, wherein said guide comprises a cavity at its end adjacent sai dpiston end face and said piston comprises a support extending into said cavity, and said engine further comprising a rotary electric motor comprising a stator coil secured in said cavity and a permanent rotor magnet fixed on said support and extending within said stator coil.

5. A piston engine as claimed in claim 3, further comprising a housing adjoining said cylinder at its end opposite said compression space, said piston extending out of said cylinder away from said compression space, and said housing having a wall radially spaced from said psiton, and said means for reciprocating said piston comprises an electric brushless translatory motor comprising stator coils secured to said housing wall and rotor magnets fixed to the outer surface of said piston.

6. A piston engine as claimed in claim 5, wherein said first set of grooves is axially located on said guide at said rotary motor, and said guide and said inner wall surface of said piston comprises a second groove dynamic bearing having a second set of grooves on said guide axially located at said translatory motor.

7. A compression device, comprising:

a pair of opposing piston engines, each piston engine comprising, a circular cylinder, a piston reciprocable in said cylinder for working on a gaseous medium present in said cylinder during engine operation, said piston being tubular, having an inner and outer wall surface of circular cross-section, an open end and a transverse end face at the opposing end;

means for translating said piston in said cylinder;

an elongate guide concentric with said piston having a circular cylindrical outer surface and extending into said piston through said open end;

said outer surface of said guide and said inner wall surface of said piston comprising a dynamic groove bearing for centering said piston in said engine during reciprocation of said piston;

said piston being sized near its end face for forming a sealing gap with said cylinder, whereby said dynamic bearing is isolated from said compression space; and a housing joining said piston engines with said pistons aligned and with said piston end faces in opposition, said housing enclosing a compression space limited on opposing sides by said piston end faces.

8. A compression device as claimed in claim 7, characterized in that said guide is a fixedly arranged mandrel.

9. A compression device as claimed in claim 8, wherein said guide comprises a cavity at its end adjacent said piston end face and said piston compreses a support extending into said cavity, and said engine further comprises a rotary electric motor comprising a stator coil secured in said cavity and a permanent rotor magnet fixed on said support and extending within said stator coil.

10. A compression device as claimed in claim 9, characterized in that said dynamic groove bearing comprises a groove pattern on said outer surface of said guide.

11. A compression device as claimed in claim 10, further comprising each piston engine having a housing portion adjoining said cylinder at its end opposite said compression space, said piston extending out of said cylinder away from said compression space and said housing portion having a wall radially spaced from said piston, and said means for reciprocating said piston comprises an electric brushless translatory motor comprising stator coils secured to said housing wall and rotor magnets fixed to the outer surface of said piston.

12. A compression device as claimed in claim 11, wherein said first set of grooves is axially located on said guide at said rotary motor, and said guide and said inner wall surface of said piston comprises a second grooved dynamic bearing the second set of grooves onsaid guide outer surface axially located at said translatory motor.

13. A cryo-cooler, comprising:

a chamber defining an expansion space, a displacer reciprocable in said expansion space; and a piston engine for supplying a gaseous medium under pressure to said expansion space, said piston engine comprising, a circular cylinder, a piston reciprocable in said cylinder for working on a gaseous medium present in said cylinder during engine operation, said piston being tubular, having an inner and outer wall surface of circular cross-section, an open end and a transverse end face at its opposing end, said engine having a compression space opposite said piston end face into which said gas is compressed during piston operation, means for reciprocating said piston in said cylinder, an elongate guide concentric with said piston having a circular cylindrical outer surface and extending into said piston through said open end, said outer guide surface and said inner wall surface of said piston comprising a dynamic groove bearing for centering said piston in said engine during reciprocation of said piston, and said piston being sized near its end face for forming a sealing gap with said cylinder, whereby said dynamic bearing is isolated from said compression space; and a regenerator connected between said expansion space and said compression space of said piston engine.

14. A cyro-cooler as claimed in claim 13, characterized in that said guide is a fixedly arranged mandrel.

15. A cryo-cooler as claimed in claim 14, wherein said guide comprises a cavity at its end adjacent said piston end face and said piston comprises a support extending into said cavity, and said engine further comprises a rotary electric motor comprising a stator coil secured in said cavity and a permanent rotor magnet fixed on said support and extending within said stator coil.

16. A cyro-cooler as claimed in claim 15, characterized in that said dynamic groove bearing comprises a groove pattern on said outer surface of said guide.

17. A cyro-cooler as claimed in claim 15, wherein said engine further compries a housing adjoining said cylinder at its end opposite said compression space, said piston extending out of said cylinder away from said compression space, and said housing having a wall radially spaced from said piston, and said means for reciprocating said piston comprises an electric brushless translatory motor comprising stator coils secured to said housing wall and rotor coils fixed to the outer surface of said piston.

18. A cyro-cooler as claimed in claim 17, wherein said first set of grooves is axially located on said guide at said rotary motor, and said guide and said inner surface of said piston comprise a second grooved dynamic bearing having a second set of grooves on said guide outer surface axially located at said translatory motor.

19. A cyro-cooler as claimed in claim 18, further comprising another said piston engine, a housing joining said piston engines with said piston end faces aligned and opposing each other, said housing enclosing a compression space limited on opposing sides by said end faces.

20. A cyro-cooler as claimed in claim 19, wherein for each piston engine said guide is a fixedly arranged mandrel.

21. A cyro-cooler as claimed in claim 20, wherein for each engine said guide comprises a cavity at its end adjacent said piston end face and said piston comprises a support extending into said cavity, and each engine further comprises a rotary electric motor comprising a stator coil secured in said cavity and a permanent rotor magnet fixed on said support and extending within said stator coil.

22. A cyro-cooler as claimed in claim 21, wherein for each engine said dynamic groove bearing comprises a groove pattern on said outer surface of said guide.

23. A cyro-cooler as claimed in claim 22, wherein each engine further comprises a housing portion adjoining said cylinder at its end opposite said compression space, said piston extending out of said cylinder away from said compression space and said housing portion having a wall radially spaced from said piston, and said means for reciprocating said piston comprises an electric brushless translatory motor comprising stator coils secured to said housing wall and rotor magnets fixed to the outer surface of said piston.

24. A cyro-cooler as claimed in claim 23, wherein for each piston engine said first set of grooves is axially located on said guide at said rotary motor and said guide and said inner surface of said piston comprise a second grooved dynamic bearing having a second set of grooves on said guide outer surface axially located at said translatory motor.

* * * * *